United States Patent [19]

Iwama et al.

[11] 4,410,568

[45] Oct. 18, 1983

[54] PROCESS FOR PREPARING SELECTIVE PERMEABLE MEMBRANE

[75] Inventors: Akio Iwama; Yasuo Kihara; Masao Abe; Yoshitaka Kazuse, all of Osaka, Japan

[73] Assignee: Nitto Electric Industrial Co., Ltd., Osaka, Japan

[21] Appl. No.: 195,038

[22] Filed: Oct. 8, 1980

Related U.S. Application Data

[63] Continuation of Ser. No. 961,167, Nov. 16, 1978, abandoned.

[30] Foreign Application Priority Data

Jan. 10, 1978 [JP] Japan .................................. 53-1730

[51] Int. Cl.³ ............................................. B05D 5/00
[52] U.S. Cl. ................................. 427/244; 264/41; 427/246; 427/352; 427/353
[58] Field of Search ...................... 210/500.2; 264/41; 427/246, 244, 352, 353, 354; 521/27, 64

[56] References Cited

U.S. PATENT DOCUMENTS 3,567,810 3/1971 Baker .................................... 264/41
3,816,303 6/1974 Wrasudlo ............................ 210/500
3,899,309 8/1975 Hoehn et al. ........................ 29/16
3,925,211 12/1975 Schumann et al. ............... 264/41 X

*Primary Examiner*—Evan K. Lawrence
*Attorney, Agent, or Firm*—Sughrue, Mion, Zinn, Macpeak and Seas

[57] ABSTRACT

A process for preparing a selective permeable membrane having self-supporting property, which comprises coating on a supporting substrate a dope comprising a polyimide polymer consisting essentially of a repeating unit of the formula:

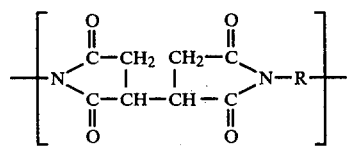

wherein R is a divalent organic group, an inorganic salt and an organic solvent, as a dope solvent, which dissolves a mixture of the polymer and the inorganic salt to form a homogeneous system, to prepare a dope coated supporting substrate, heat treating the substrate at a temperature which does not cause the organic solvent in the dope to boil, and then coagulating the substrate.

17 Claims, 2 Drawing Figures

PROCESS FOR PREPARING SELECTIVE PERMEABLE MEMBRANE

This is a continuation of application Ser. No. 961,167, filed Nov. 16, 1978, now abandoned.

BACKGROUND OF THE INVENTION

1. Field of the Invention

This invention relates to a process for preparing selective permeable membrane useful in reverse osmosis and ultrafiltration that has the ability to selectively separate the solvent from liquid mixtures such as solutions, emulsions and suspensions.

2. Description of the Prior Art

Typical examples of a selective permeable membranes which are only permeable to a specific component of a solution and emulsion are a reverse osmosis membranes and an ultrafiltration semipermeable membranes. The reverse osmosis membranes can separate the solvent from a solution containing matter of a relatively small particle size or substances of a low molecular size such as sodium chloride and is used in treating waste water from plants, purifying sewage and desalination of sea water and brine.

The ultrafiltration membrane, on the other hand, is capable of separating the solvent or dispersion medium from a solution or emulsion containing substances of a relatively large particle or molecuar size such as colloids, proteins or microorganisms, or a polymer and is used in purification and concentration steps involved in the manufacture of foods and medicines as well as in the brewing and fermentation industries.

Heretofore, selective permeable membranes of this kind have been made from cellulose acetates, polyamides, polysulfones, etc. However, selective permeable membranes made from cellulose acetates and polyamides are not only low in heat resistance but they also have poor resistance to chemicals such as alkali and strong acids, which frequently make up the liquid mixture treated by the membrane.

Permeable membranes made from polysulfones have more heat and chemical resistance than those made from cellulose acetates and polyamides but they have poor resistance to organic solvents.

An attempt has recently been made to make a selective permeable membrane using an aromatic polyimide made up of an aromatic tetracarboxylic acid and a diamine, but the process requires converting the amide acid moiety in the molecular skeleton of the resulting selective permeable membrane to an imide ring at high temperature and this additional step gives the product low permeability.

SUMMARY OF THE INVENTION

As a result of various studies in search of a selective permeable membrane free from the defects of the conventional product, it has been found that a selective permeable membrane comprising a polyimide having a repeating unit of the formula below exhibits high selectivity.

Accordingly, one object of this invention is to provide a process for preparing a selective permeable membrane having self-supporting property, which comprises coating on a supporting substrate a dope comprising a polyimide polymer consisting essentially of a repeating unit of the formula:

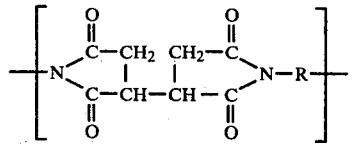

where R is a divalent organic group; an inorganic salt and an organic solvent, as a dope solvent, which dissolves a mixture of the polymer and the inorganic salt to form a homogeneous system, to prepare a dope coated supporting substrate; heat treating the substrate at a temperature which does not cause the organic solvent in the dope to boil, and then coagulating the substrate.

DETAILED DESCRIPTION OF THE INVENTION

Figure 1:
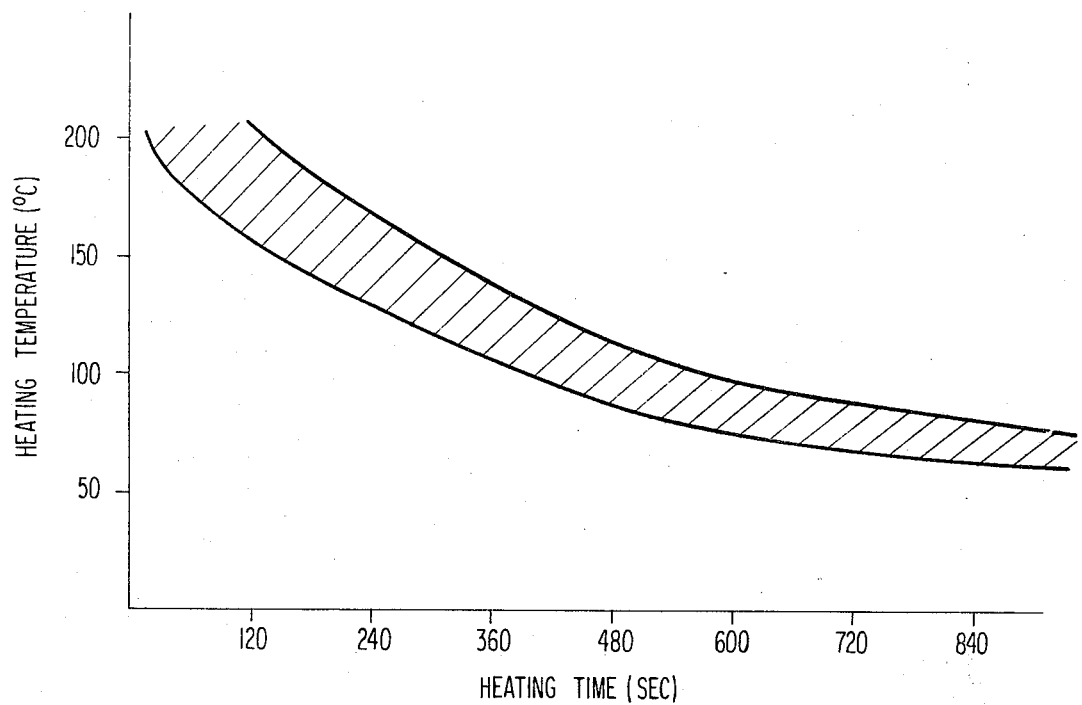
FIG. 1 is a graph showing the relationship between heating temperature and heating time for heat treatment used in this invention when NMP is used as a dope solvent.

The selective permeable membrane of this invention comprises a polyimide polymer consisting essentially of a repeating unit of the formula:

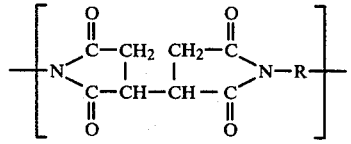

wherein R is a divalent organic group, into a membrane or film exhibiting high selectivity. This polymer is a homopolymer when the repeating units contain the same R whereas it is a copolymer when the repeating units contain different R.

The polyimide polymer of the above formula is based on an aliphatic tetracarboxylic acid, and is generally prepared by dehydrocondensing 1,2,3,4-butanetetracarboxylic acid (hereinafter referred to as "BTC", for simplicity) of the formula

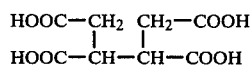

and a diamine of the general formula

wherein R is a divalent organic group as defined above in substantially equimolar amounts at about 100° to 300° C. for about 10 to 50 hours.

In order to obtain a homogeneous reaction system an organic solvent is used for the dehydrocondensation reaction. Typical reaction solvents are N-alkyl pyrrolidones such as N-methyl-2-pyrrolidone, dimethyl acetoamide, N-alkyl piperidones, dimethyl formamide, dihydroxybenzene, phenols (such as phenol, cresol), etc.

Such organic solvents are used in amounts sufficient to provide a uniform reaction, normally in an amount of about 60 to 900 parts by weight per 100 parts by weight of the sum of BTC and diamine.

Preferred reaction solvents are N-alkyl pyrrolidones such as N-methyl-2-pyrrolidone and N-alkyl piperidones because they have high boiling points and permit reaction at high temperature and they are good solvents for BTC, diamine, and the resulting polyimide polymer.

The polyimide polymer thus prepared has self-supporting property, that is the ability to form a membrane or film.

The polyimide polymer which can be used in this invention has an inherent viscosity (measured at 30° C. in N-methyl-2-pyrrolidone) of about 0.55 to 1.2, preferably about 0.60 to 1.00. Too low an inherent viscosity does not provide a selective permeable membrane having high self-supporting property. Too high an inherent viscosity, on the other hand, makes it difficult to prepare a homogeneous film making liquor (called a "dope").

The polyimide polymer which can be used in this invention has a number average molecular weight ranging from about 20,000 to 120,000, preferably from about 30,000 to 80,000, which can be calculated from the above inherent viscosity. The polyimide polymer of the formula defined above generally has about 60 to 300, preferably about 90 to 200, repeating units of the above formula whose number can also be calculated from the inherent viscosity.

If BTC and diamine are reacted at a temperature of about 100° to 300° C., the linking groups are substantially composed of imide rings, but at about 30° to 80° C., amide bonds as well as imide rings are formed as linking groups.

The preferred polyimide polymer which can be used in this invention is essentially free of amide bonds, and it is most preferred that all or substantially all of the linking groups are imide rings.

However, the presence of some amide bonds is permissible in the polyimide polymer of this invention as long as the percentage of the conversion to imide calculated as:

$$\frac{\text{number of imide rings}}{\text{number of imide rings} + \text{number of amide bonds}} \times 100$$

is at least about 70%, preferably at least about 90%, and most preferably from about 98 to 100%. Too low a percentage of conversion to imide produces a selective permeable membrane which has low heat and chemical resistance.

The above explanation is given with respect to the use of BTC, but BTC imide-forming derivatives other than BTC may be used in this invention. Typical examples of the BTC imide-forming derivative are BTC monoanhydride, BTC dianhydride, BTC lower alkyl esters such as BTC dimethyl ester, and BTC amide.

The diamine which is used in the preparation of the polyimide polymer is a compound of the general formula $$H_2N-R-NH_2$$

wherein R is a divalent aromatic group, a divalent group where at least two aromatic groups are linked with a divalent group, a divalent aliphatic group, a divalent group where at least two aliphatic groups are linked with a divalent group, a divalent alicyclic group, or a divalent group where at least two alicyclic groups are linked with a divalent group, with R being capable of sterically fully rotating about its bonds in the main chain of the polyimide polymer.

Suitable examples of the divalent aromatic group are

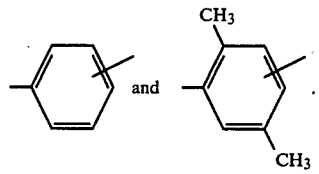

Suitable examples of the divalent group where at least two aromatic groups are linked with a divalent group are

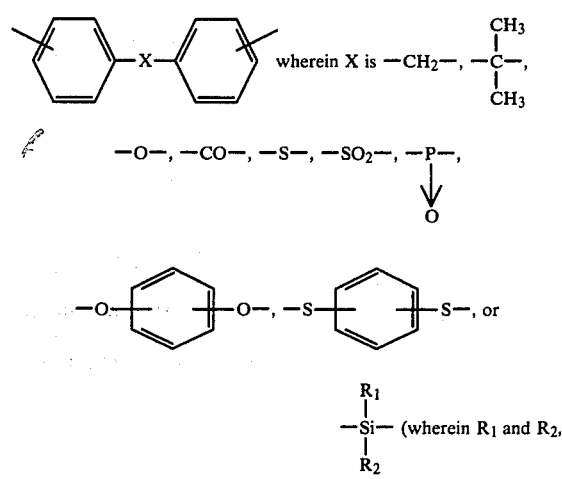

which may be the same or different, each represents a straight or branched alkyl group having 1 to 10 carbon atoms or a cycloalkyl group having 3 to 10 carbon atoms).

Suitable examples of the divalent aliphatic group are

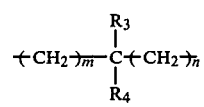

wherein $R_3$ is hydrogen atom, an alkyl group having 1 to 3 carbon atoms or an alkoxy group having 1 to 3 carbon atoms, $R_4$ is hydrogen atom or an alkyl group having 1 to 4 carbon atoms, and m and n each are an integer of 1 to 6, and

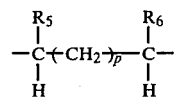

wherein $R_5$ is an alkyl group having 1 to 3 carbon atoms, $R_6$ is hydrogen atom or an alkyl group having 1 to 3 carbon atoms, and p is an integer of 1 to 10.

Suitable examples of the divalent group where at least two aliphatic groups are linked with a divalent group are

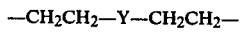
—CH$_2$CH$_2$—Y—CH$_2$CH$_2$— wherein Y is —O— or —S—, and

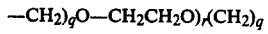
—CH$_2$)$_q$O—CH$_2$CH$_2$O)$_r$(CH$_2$)$_q$ wherein q is an integer of 1 to 5 and r is an integer of 1 to 3.

Suitable examples of the divalent alicyclic group are

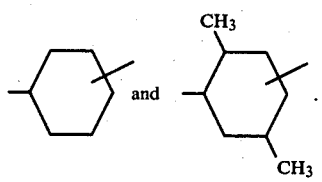

Suitable examples of the divalent group where at least two alicyclic groups are linked with a divalent group are

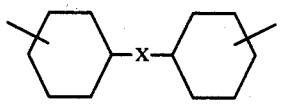

wherein X is defined as above.

Specific examples of suitable diamines are metaphenylenediamine, paraphenylenediamine, 4,4'-diaminodiphenylmethane, 4,4'-diaminodiphenylpropane, 4,4'-diaminodiphenyl ether, 3,4'-diaminodiphenyl ether, 4,4'-diaminodiphenyl sulfide, 4,4'-diaminodiphenyl sulfone, 3,3'-diaminodiphenyl sulfone, para-bis(4-aminophenoxy)benzene, meta-bis(4-aminophenoxy)benzene, metaxylylene diamine, paraxylylene diamine, di(para-amino-cyclohexyl)methane, hexamethylenediamine, heptamethylenediamine, octamethylenediamine, 1,4-diaminocyclohexane, bis-(4-aminophenyl)phosphine oxide, bis(4-aminophenyl)diethyl silane, bis(4-aminophenyl)dicyclohexyl silane, 4,4'-dimethylheptadiamine, 3-methoxyheptanemethylene diamine, 2,11-diaminododecane, 4,4'-diaminodicyclohexyl ether; these diamines can be used individually or in admixtures thereof.

Diamines which can advantageously be used in this invention are those wherein R is an organic group having an aromatic ring or containing at least one hydrophilic group such as —O—, —SO$_2$—, and —CO—. Diamines wherein R has both an aromatic ring and hydrophilic group are used most advantageously.

Using a diamine wherein R is an organic group containing an aromatic ring provides a selective permeable membrane exhibiting the high selectivity at high temperatures, whereas using a diamine wherein R is an organic group containing a hydrophilic group provides a membrane which solvents or dispersion media can permeate at a high rate.

The inorganic salts which can be used in this invention are chlorides, nitrates or sulfates of alkali metals or alkaline earth metals.

Typical examples of these salts include lithium nitrate, potassium nitrate, lithium chloride, potassium chloride, calcium chloride, calcium nitrate, magnesium sulfate, lithium bromide, potassium bromide, etc.

Examples of the organic solvent which can be used as the dope solvent in this invention include N-alkyl-2-pyrrolidones such as N-methyl-2-pyrrolidone or N-ethyl-2-pyrrolidone, N-alkyl-2-piperidones such as N-methyl-2-piperidone, dimethyl acetoamide, dimethyl formamide, tetramethyl urea and mixtures thereof. N-methyl-2-pyrrolidone is preferred. The dope solvent is miscible in the coagulation medium such that upon immersing the coated dope in the coagulation medium the dope solvent diffuses from the dope and the polyimide polymer coagulates.

Any solvent can be used as the coagulation medium in this invention provided it does not dissolve the polyimide polymer and is highly miscible with the dope solvent and preferably completely miscible (i.e., miscible in any amount) with the dope solvent.

A typical coagulation medium depending on the dope solvent used is water. Other examples include methanol, ethanol, ethylene glycol and a mixture of water with methanol, ethanol or ethylene glycol.

According to one embodiment of this invention, the polyimide polymer defined above and an inorganic salt are dissolved in an organic solvent (dope solvent) having high miscibility with the coagulation medium to form a solution of the polyimide polymer (called "dope"). The dope is flow coated onto a suitable supporting substrate in a desired thickness, and thereafter, the dope coated substrate is heated at a temperature which does not cause the organic solvent to boil. Thereafter the coated substrate placed in the coagulation medium to coagulate the dope.

In the above embodiment of this invention, the supporting substrate is generally a glass plate, glass tube or other substrate having a smooth surface.

It is advantageous in this invention to prepare the polyimide polymer in the presence of a reaction solvent comprising an organic solvent which is highly miscible with the coagulation medium and can dissolve the inorganic salt used. By so doing, the resulting solution of polyimide polymer in the reaction solvent can be readily used as the dope of this invention as it is or after proper dilution or concentration. The reaction solvent which is most suitable for this purpose is N-methyl-2-pyrrolidone or dimethyl formamide.

According to the above described process for preparing a selective permeable membrane from the polyimide polymer, the concentration of the dope (the polyimide polymer or solid content in the dope) is normally from about 5 to 30 wt%, preferably from about 15 to 25 wt%. If the dope concentration is less than about 5 wt%, the resulting selective permeable membrane exhibits poor selectivity, whereas if the dope concentration exceeds about 30 wt%, the dope becomes so viscous that the rate at which a solvent or dispersion medium will permeate the resulting membrane is reduced.

According to this invention, the dope which the supporting substrate is coated with has a viscosity (measured by a B-type viscometer at 30° C.) which is generally from about 10 to 1,000 poises, preferably from about 50 to 300 poises, and most preferably from about 100 to 200 poises.

To coat the substrate with a dope of high viscosity, the method disclosed in Japanese Patent Application No. 10697/75 entitled "Process for Preparing Tubular Semipermeable Membrane" or a mechanical extrusion coating method may preferably be used. The substrate is generally coated with the dope at room temperature.

Examples of the supporting substrate having a smooth surface are sheets or tubes of inorganic materials such as glass, widely used metals such as stainless steel and aluminum, and solid plastics such as polyethylene and polypropylene, etc.

The thickness of the dope with which the supporting material is coated varies depending on the purpose for which the resulting selective permeable membrane is used. The thickness is controlled such that the selective permeable membrane obtained generally has a thickness of about 50 to 400μ, preferably from about 150 to 250μ. If the coating is too thin, the resulting permeable membrane has poor strength in use. If the coating is too thick, the resulting membrane may have satisfactory selectivity, but the permeation rate of the membrane may be slow and the film making procedure will take too much time.

The thickness of the resulting selective permeable membrane is generally determined by the coating thickness of dope, but this does not apply in all cases because given the same dope coating thickness, the higher the polyimide polymer concentration of the dope, the thicker is the membrane. To take an example, given a dope having a coating thickness of about 250μ, use of the dope having the polyimide polymer content of 25 wt% provides a selective permeable membrane of about 120μ thick, whereas the use of the dope having the polyimide polymer content of 15 wt% gives a thickness of about 90μ.

For practical application, the dope coated supporting substrate is generally subjected to heat treatment within about 5 minutes after its preparation, but is may be allowed to stand for about 1 to 2 hours before heat treatment. However, an extremely long period of standing prior to heat treatment does not produce a desired selective permeable membrane. In general, the dope coated supporting substrate should be subjected to heat treatment before the surface of the dope loses its transparency and becomes white-turbid.

According to this invention, heating must be performed at a temperature which does not cause the dope solvent in the dope to boil. Boiling in the dope solvent causes air bubbles to occur in the resulting selective permeable membrane, thus failing to provide the desired membrane of this invention.

Heating is generally effected at a temperature lower than the boiling point of the dope solvent. Heating at a temperature higher than the boiling point of the dope solvent but only for a short period of time is permissible in this invention as long as it does not cause the solvent to boil.

According to this invention, the dope solvent is evaporated from the surface layer of the heated dope opposite the face in contact with the supporting substrate, thus providing a surface area with a very high concentration of the polyimide polymer. Accordingly the heat treatment is conducted at a temperature and for a period of time sufficient to form such very thin area on the surface of the coating having a higher polymer concentration.

If the dope solvent is, for example, N-methylpyrrolidone (boiling point: 202° C.), heating is preferably performed in the area bounded by oblique lines in FIG. 1. If the solvent is dimethyl formamide (boiling point: 153° C.), heating is preferably performed in the region that is shifted vertically down from the shadowed region of FIG. 1 by the difference in boiling point between the two solvents (202° C.−153° C.=49° C.). The same applies to other organic solvents used as the dope solvent that is if the solvent boils at a temperature lower than 202° C., heating is preferably effected in the region shifted vertically down from the shadowed region of FIG. 1 by 202° C. minus the boiling point of the solvent, whereas if the solvent boils at a temperature higher than 202° C., heating is preferably performed in the region shifted vertically upward from the shadowed region of FIG. 1 by the boiling point of the solvent minus 202° C.

Generally speaking, heating is preferably effected at a high temperature for a short period. Extended heating is required at low temperature. For instance, if the dope solvent is N-methyl-2-pyrrolidone, heating continues for about 2 minutes at 180° C., and about 5 minutes at 150° C.

In this invention, heating is ordinarily carried out by flowing hot air of the desired temperature onto the surface of the dope.

According to this invention, a supporting substrate in sheet form having a flat smooth surface gives a sheet-like membrane, whereas a supporting substrate in tubular form having a smooth surface provides a tubular membrane.

The dope coated supporting substrate thus heated should not be left standing an excessively long before it is placed in the coagulation medium because the resulting selective permeable membrane may as a result have poor selectivity. Therefore, the time between heating and immersion in the coagulating medium should be such that it provides a practically effective selective permeable membrane. Generally the coated substrate is placed in the coagulation medium within 5 minutes, preferably within 1 minute, and most preferably, the coated substrate is put in the coagulation medium as soon as heating is finished.

There is no particular limitation on the temperature at which coagulation takes place in the coagulation medium, but it is generally lower than the boiling point of the coagulation medium. If the medium is water, the temperature is typically from about above 0° to about 80° C., preferably from about above 0° to 50° C. (above 0 meaning the water is not solid). The time required for coagulation depends on the coagulation temperature, and is generally from about 1 to 5 hours.

The selective permeable membrane obtained in accordance with the invention can be stored in the coagulation medium without being recovered, in this case, the storage is continuous and inseparable from the step of coagulation. The selective permeable membrane having been shaped through coagulation in the coagulation medium can easily be separated from the supporting substrate having a smooth surface.

The selective permeable membrane prepared by the method described above is a so called "anisotropic membrane".

To be more specific, as described hereinabove, when the dope coated supporting substrate is subjected to heat treatment, the dope solvent evaporates from the surface layer of the heated dope opposite to the face in contact with the supporting substrate, thus providing a surface region having a very thin area of a high concentration of polyimide polymer. It is believed that through coagulation in the coagulation medium, this very thin area becomes a tight thin layer (skin layer) whereas the underlying dope layer is porous and thereby provides an anisotropic membrane. It is also contemplated that the skin layer has a thickness on the order of about 0.01 to 1μ.

Figure 2:
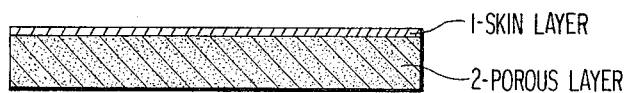
FIG. 2 is a cross-sectional view of an anisotropic membrane according to this invention.

Therefore, a selective permeable membrane prepared by the above described method comprises a skin layer (1) on one surface of a porous layer (2), as shown in FIG. 2. A membrane of such structure is generally referred to as "an anisotropic membrane". The pore size of the skin layer does not exceed the pore size of the porous layer. The skin layer provides the membrane with the ability to perform reverse osmosis or ultrafiltration. The porous layer enables the solvent or dispersion medium to pass out of the membrane after passage through the skin layer.

According to this invention, the resulting selective permeable membrane may be optionally heated at about 100° to 400° C. for about 5 seconds to about 30 minutes, typically about 30 seconds to about 10 minutes for the purpose of, for instance, to increase its mechanical strength at high temperatures. The heating time varies with temperature; heating may continue for about 20 to about 25 minutes at 100° C., and only for a few seconds to several tens of seconds at 350° C. The heat treatment may be conducted in air, hot water or ethylene glycol.

Such are the characteristics of the selective permeable membrane prepared by the process of this invention that it exhibits not only high heat resistance, high selectivity, high chemical resistance and high mechanical strength but it allows a solvent or dispersion medium to penetrate through it at a high rate. What is more, the membrane withstands extended use without suffering mechanical damage or deteriorated performance due to chemical change in the membrane and may be used over a wide pH range.

Accordingly, the selective permeable membrane of this invention can advantageously be used for desalination of sea water and brine, the treatment of sewage, as well as for the purification and concentration involved in the food and fermentation industries.

The process of this invention can be put into practice with some modifications. For instance, to improve, say, the mechanical strength of the selective permeable membrane to be prepared, the dope may be mixed with a self-supporting material which is compatible with it, such as polysulfone (Polysulfone P-1700, P-3500, products of Union Carbide, etc.) or polyphenylene oxide (PPO-534, product of General Electric, etc.) before the selective permeable membrane is prepared from the dope by repeating the procedure described herein. The self-supporting material compatible with the dope may be used in an amount of about 20 parts by weight or less, preferably 5 parts by weight or less, per 100 parts by weight of the polyimide polymer of which the dope is composed. If more than 20 parts by weight of the material is used, a homogeneous dope cannot be obtained. If the dope contains such self-supporting material, the concentration of dope should be adjusted such that it is generally from about 5 to 30 wt% (solid content) as specified herein, including the supporting material.

The amount of inorganic salts added to the dope in this invention varies depending on the concentration of dope and the kind of doping element, but there is no particular limit on the amount as long as the salts are uniformly dissolved in the dope. Typically, the salts are added in an amount of about 100 parts by weight or less, preferably in the range of from about 10 to 95 parts by weight, per 100 parts by weight of the polyimide polymer of which the dope is composed. Use of too much salt has a tendency to give a less homogeneous dope.

The salts described above may be added to the dope in solid form, or uniformly dissolved in the dope by suitable means such as stirring under heating if necessary or they may be first dissolved in the doping solvent.

The process described hereinabove relates to a technique of preparing a sheet or tube of selective permeable membrane using a substrate having a smooth surface, but it will be readily apparent to those skilled in the art that the following modification is possible. A supporting fibrous substrate in sheet form made of woven cloth of organic fibers such as polyester fibers and acryl fibers or inorganic fibers such as glass fibers may be coated with the dope by suitable means such as roll coating, spraying or immersion, and the dope is shaped into a film by a wet method, dry method or a combination of two methods. By this process, a selective permeable membrane reinforced with the fibrous substrate in sheet form is produced. One example of this modified process is disclosed in Japanese Patent Application No. 124,771 (filed Oct. 17, 1977 entitled "Process for Preparing Selective Permeable Membrane").

The invention will now be described in greater detail by reference to the following examples. In the examples, the following formulae are used to calculate the desalination efficiency and the water permeating rate, which are commonly used to evaluate the performance of a selective permeable membrane.

Desalination efficiency =

$$\left(1 - \frac{\text{concentration of permeate (\% by weight)}}{\text{concentration of feed solution (\% by weight)}}\right) \times 100 \, (\%)$$

Water permeating rate =

$$\frac{\text{volume of permeate } (m^3)}{\text{effective area of selective permeable membrane } (m^2) \times \text{processing time (day)}}$$

Both the desalination efficiency and the water permeating rate are determined at 25° C.

SYNTHESIS EXAMPLE 1

Preparation of polyimide polymer

A 20 liter reactor equipped with a stirrer, an inlet for nitrogen gas, a reflux column equipped with a device for draining reaction water and a water jacket that can be heated up to 250° C. was charged with 14.8 kg of N-methyl-2-pyrrolidone (hereinafter referred to as "NMP"), 2.81 kg of BTC and 2.40 kg of 4,4'-diaminodiphenyl ether, and heated to about 70° C. to obtain a homogeneous solution.

The homogeneous reaction system obtained was mixed with 1.7 kg of xylene as an azeotropic solvent, heated to 175° to 195° C. under a nitrogen flow. Then under a reflux of xylene the reaction water was distilled off by azeotropic distillation and continuously drained to thereby perform the imide forming reaction.

As the reaction proceeded, the viscosity of the reaction system increased, with the result that 860 g of water was distilled off in about 35 hours. After the reaction, the xylene was removed to obtain a solution of a polyimide polymer in NMP having a solid (polymer) content of 25% and a viscosity of 180 poises (measured with a B-type viscometer at 30° C.).

The polyimide polymer obtained had an inherent viscosity [η] of 0.76 at 30° C. NMR and IR spectra showed that the degree of conversion to imide in the polyimide polymer was not lower than 99%.

SYNTHESIS EXAMPLE 2

Preparation of polyimide polymer

The procedure of Synthesis Example 1 was repeated using 1.50 kg of BTC, 1.27 kg of diaminodiphenylmethane and 12.8 kg of NMP. A solution of polyimide polymer in NMP having a solid base content of 18% and a viscosity of 57 poises (measured with a B-type viscometer at 30° C.) was obtained.

The polyimide polymer had an inherent viscosity [η] of 0.58 at 30° C. NMR and IR spectra showed that the degree of conversion to imide in the polyimide polymer was not lower than 99%.

SYNTHESIS EXAMPLE 3

Preparation of dope I 75 parts by weight of lithium nitrate finely ground in a mortar were dissolved in 100 parts by weight of the solution of polyimide of Synthesis Example 1 with stirring for 5 hours at 100° C. to thereby produce a homogeneous dope.

SYNTHESIS EXAMPLE 4

Preparation of dope II

A dope was prepared by uniformly mixing in an amount corresponding to 50 parts by weight of potassium nitrate a 15 wt% solution of potassium nitrate in NMP with 100 parts by weight of the polyimide polymer obtained in Synthesis Example 2.

SYNTHESIS EXAMPLES 5 TO 7

Preparation of dopes

Using the same procedure of Synthesis Example 3, dopes were prepared from the components shown in Table 1 below.

SYNTHESIS EXAMPLES 8 AND 9

Preparation of dopes

Using the procedure of Synthesis Example 4, dopes were prepared from the components indicated in Table 1 below.

TABLE 1

| Synthesis Example | Solution of Polyimide Polymer | Inorganic Salt Added | Amount of Inorganic Salt (parts per 100 parts by weight of polymer) |
|---|---|---|---|
| 5 | Solution of polyimide polymer prepared in Synthesis Example 1 | potassium chloride | 50 |
| 6 | Solution of polyimide polymer prepared in Synthesis Example 1 | lithium nitrate | 100 |
| 7 | Solution of polyimide polymer prepared in Synthesis Example 1 | calcium nitrate | 20 |
| 8 | Solution of polyimide polymer prepared in Synthesis Example 2 | potassium chloride | 75 |
| 9 | Solution of polyimide polymer prepared in Synthesis Example 2 | lithium nitrate | 50 |

EXAMPLE 1

A glass plate substrate was coated with a 275μ thick dope obtained in Synthesis Example 3. The substrate was immediately placed in an air circulating oven and heat treated at 150° C. for 240 seconds. After heat treatment, the substrate was allowed to stand at room temperature for 1 minute and then placed in a 0° C. water bath for 5 hours to coagulate the dope.

The selective permeable membrane obtained had a thickness of 110μ.

The membrane was mounted in a measuring cell of pressure batch type and supplied with a 5,000 ppm aqueous solution of sodium chloride to determine the water permeating rate and the desalination efficiency at an operating pressure of 42 kg/cm$^2$.

The results are shown in Table 3 below.

EXAMPLE 2

The inner surfaces of a glass tube having an inner diameter of 13.6 mm and a wall thickness of about 3 mm were flow coated with a 270μ thick dope obtained in Synthesis Example 4. Hot air of 150° C. was introduced into the tube of the dope coated supporting substrate for 180 seconds while rotating the tube at a speed of 50 rpm to prevent flow-down of the dope. Immediately after the hot air introduction, the tube was placed in water at 5° C. for 5 hours to coagulate the dope. A tubular selective permeable membrane having an outer diameter of 13.4 mm and a thickness of 120μ was obtained.

The membrane was slipped into a perforated stainless steel tube having an outer diameter of 17.0 mm and a wall thickness of 2 mm, and supplied with a 5,000 ppm aqueous solution of sodium chloride at 42 kg/cm$^2$ to determine the desalination efficiency and water permeating rate. The results are shown in Table 3 below.

EXAMPLES 3 TO 9

The procedures of Example 1 were repeated under the conditions shown in Table 2 below.

The characteristics of the membranes obtained are shown in Table 3.

EXAMPLES 10 TO 12

The procedures of Example 1 were repeated under the conditions indicated in Table 2 below.

The characteristics of the membranes obtained are shown in Table 3.

TABLE 2

| Example No. | Dope used (Syn. Ex.) | Dope Coating Thickness ($\mu$) | Time from Preparation of Coated Substrate to Heating (sec.) | Heating Condition Temperature (°C.) | Heating Condition Time (sec.) | Time after Heat-treatment to Coagulation (sec.) | Coagulation Conditions Solvent | Coagulation Conditions Temperature (°C.) | Coagulation Conditions Time (min.) | Membrane Thickness ($\mu$) |
|---|---|---|---|---|---|---|---|---|---|---|
| 3 | 3 | 300 | 10 | 180 | 120 | 30 | water | 1.0 | 300 | 90 |
| 4 | " | 300 | 60 | 115 | 420 | 60 | " | 1.0 | 300 | 115 |
| 5 | 5 | 300 | 40 | 180 | 120 | 20 | " | 1.0 | 300 | 100 |
| 6 | " | 300 | 60 | 150 | 300 | 80 | " | 1.0 | 300 | 110 |
| 7 | 6 | 300 | 120 | 150 | 300 | 60 | " | 1.0 | 300 | 125 |
| 8 | 7 | 300 | 180 | 120 | 360 | 100 | " | 5.0 | 300 | 135 |
| 9 | 9 | 300 | 30 | 150 | 240 | 50 | " | 1.0 | 300 | 90 |
| 10 | 3 | 300 | 100 | 150 | 240 | 60 | " | 1.0 | 300 | 115 |
| 11 | " | 300 | 60 | 110 | 420 | 30 | " | 1.0 | 300 | 120 |
| 12 | 8 | 300 | 20 | 150 | 240 | 5 | " | 10.0 | 300 | 110 |

TABLE 3

| Example No. | Rate Permeating Rate (m³/m² day) | Desalination Efficiency (%) | Condition for Measuring Water Permeating Rate and Desalination Efficiency |
|---|---|---|---|
| 1 | 0.97 | 95.2 | — |
| 2 | 1.09 | 93.6 | — |
| 3 | 0.32 | 98.0 | Example 1 |
| 4 | 0.17 | 94.5 | " |
| 5 | 0.61 | 97.5 | " |
| 6 | 0.54 | 98.2 | " |
| 7 | 0.88 | 96.6 | " |
| 8 | 0.87 | 91.9 | " |
| 9 | 0.41 | 96.5 | " |
| 10 | 1.80 | 93.7 | Example 2 |
| 11 | 1.52 | 95.3 | " |
| 12 | 0.98 | 90.0 | " |

While the invention has been described in detail and with reference to specific embodiments thereof, it will be apparent to one skilled in the art that various changes and modifications can be made therein without departing from the spirit and scope thereof.

What is claimed is:

1. A process for preparing a selective permeable membrane having self-supporting property, which comprises coating on a supporting substrate a dope comprising a polyimide polymer consisting essentially of a repeating imide ring containing unit of the formula:

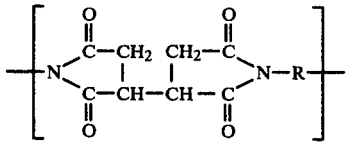

wherein R is a divalent organic group selected from the group consisting of (1) a divalent aromatic group, (2) a divalent aromatic group where at least two aromatic groups are linked with a divalent group, (3) a divalent aliphatic group, (4) a divalent aliphatic group where at least two aliphatic groups are linked with a divalent group, (5) a divalent alicyclic group, and (6) a divalent alicyclic group where at least two alicyclic groups are linked with a divalent group, wherein the nitrogen atom of each imide ring is bonded to a carbon atom in said divalent organic group R and wherein said divalent organic group R is capable of sterically fully rotating about its bonds in the main chain of said polyimide polymer; an inorganic salt and an organic solvent, as a dope solvent, capable of dissolving the mixture of the polymer and the inorganic salt to form a homogenous system, to prepare a dope coated supporting substrate, heat treating the substrate at a temperature which does not cause the organic solvent in the dope to boil, and then coagulating the substrate in a coagulation medium.

2. The process of claim 1, wherein the inherent viscosity of the polyimide polymer is about 0.55 to 1.2.

3. The process of claim 1, wherein the polyimide polymer comprises linking groups containing imide rings and amide bonds and the proportion of imide rings in the polyimide polymer to the total of imide rings and amide bonds in the polyimide polymer is at least about 70% imide rings.

4. The process of claim 1, wherein R is an organic group containing an aromatic ring.

5. The process of claim 1, wherein R is an organic group containing a hydrophilic group.

6. The process of claim 1, wherein R is an organic group containing an aromatic ring and a hydrophilic group.

7. The process of claim 1, wherein the inorganic salt is a chloride, a nitrate or a sulfonate of an alkali metal or an alkaline earth metal.

8. The process of claim 1, wherein the supporting substrate has a smooth surface.

9. The process of claim 1, wherein the heat treatment is carried out at a temperature lower than the boiling point of the organic solvent.

10. The process of claim 1, wherein the dope concentration is from about 5 to 30% by weight.

11. The process of claim 1, wherein the coagulation medium is water.

12. The process of claim 1, wherein the amount of the organic salt present in the dope is about 100 parts by weight or less per 100 parts by weight of the polyimide polymer.

13. The process of claim 1, wherein the dope further contains a self-supporting material which is compatible with the dope.

14. The process of claim 1, wherein R is a divalent aromatic group selected from the group consisting of

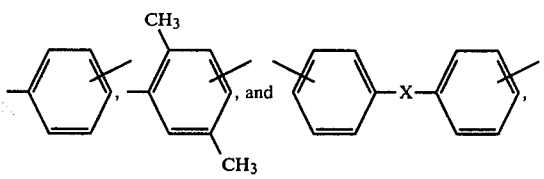

-continued wherein X is $-CH_2-$, 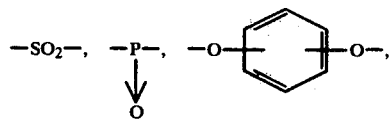

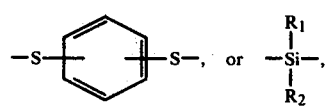

$-S-\phantom{x}\phantom{x}-S-$, or $-\underset{R_2}{\overset{R_1}{\underset{|}{\overset{|}{Si}}}}-$, wherein $R_1$ and $R_2$, which may be the same or different, each represents a straight or branched alkyl group having 1 to 10 carbon atoms or a cycloalkyl group having 3 to 10 carbon atoms.

15. The process of claim 1, wherein R is a divalent aliphatic group selected from the group consisting of a compound of the formula

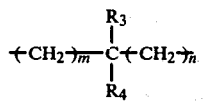

wherein $R_3$ is a hydrogen atom, an alkyl group having 1 to 3 carbon atoms or an alkoxy group having 1 to 3 carbon atoms, $R_4$ is a hydrogen atom or an alkyl group having 1 to 4 carbon atoms, and m and n each are an integer of 1 to 6, and of the formula

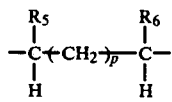

wherein $R_5$ is an alkyl group having 1 to 3 carbon atoms, $R_6$ is a hydrogen atom or an alkyl group having 1 to 3 carbon atoms, and p is an integer of 1 to 10.

16. The process of claim 1, wherein R is a divalent aliphatic group of the formula $-CH_2CH_2-Y-CH_2CH_2-$ wherein Y is $-O-$ or $-S-$, or of the formula

$-(CH_2)_qO-(CH_2CH_2O)_r(CH_2)_q$ wherein q is an integer of 1 to 5 and r is an integer of 1 to 3.

17. The process of claim 1, wherein R is a divalent alicyclic group of the formula

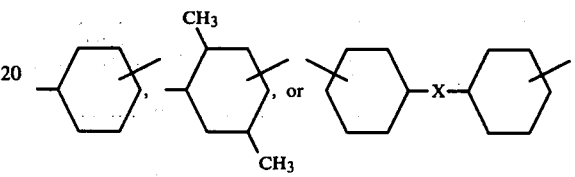

wherein X is $-CH_2-$, 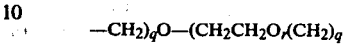

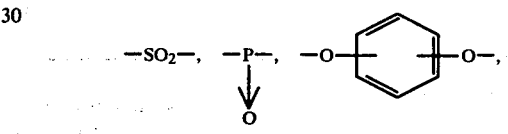

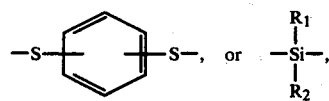

wherein $R_1$ and $R_2$, which may be the same or different, each represents a straight or branched alkyl group having 1 to 10 carbon atoms or a cycloalkyl group having 3 to 10 carbon atoms.

* * * * *